United States Patent [15] 3,660,201
Senior et al. [45] May 2, 1972

[54] PROCESS FOR PRODUCING A DECORATIVE LAMINATED PLASTIC STRUCTURE CONTAINING IN AT LEAST ONE LAYER THEREOF FROM ABOUT 4 TO ABOUT 100 PARTS PER MILLION OF A LITHIUM COMPOUND

[72] Inventors: Alwyn Senior, Greenhills; George Edward Power, Wyoming, both of Ohio

[73] Assignee: Formica Corporation, Cincinnati, Ohio

[22] Filed: Dec. 2, 1969

[21] Appl. No.: 881,605

Related U.S. Application Data

[63] Continuation-in-part of Ser. No. 572,668, Aug. 16, 1966, abandoned.

[52] U.S. Cl..............................156/309, 156/306, 156/313, 156/331, 156/64, 161/97
[51] Int. Cl. ............................................................C09j 5/00
[58] Field of Search....................156/64, 309, 306, 313, 181, 156/331; 161/97

[56] References Cited

UNITED STATES PATENTS 2,795,524   6/1957   Rodman............................156/62.8 X
3,408,239   10/1968  Wedin................................156/62.8

Primary Examiner—Carl D. Quarforth
Assistant Examiner—Stephen J. Lechert, Jr.
Attorney—James T. Dunn

[57] ABSTRACT

This invention relates to the process for producing a decorative laminated plastic structure in which the thermosetting resin used to impregnate at least one of the fibrous layers of said structure contains a quantity of a lithium compound sufficient to provide from about 4 to about 100 parts per million of said lithium compound in said laminated plastic structure.

7 Claims, No Drawings

PROCESS FOR PRODUCING A DECORATIVE LAMINATED PLASTIC STRUCTURE CONTAINING IN AT LEAST ONE LAYER THEREOF FROM ABOUT 4 TO ABOUT 100 PARTS PER MILLION OF A LITHIUM COMPOUND

CROSS-REFERENCE TO A RELATED APPLICATION

This application is a continuation in part of our earlier application having the Ser. No. 572,668, filed on Aug. 16, 1966 now abandoned, entitled, "Product."

BACKGROUND OF THE APPLICATION

Decorative laminates have been produced for a considerable number of years by a plurality of prior art processes. In making such laminates, it is conventional to utilize a plurality of resin-impregnated core sheets. The core sheets are kraft paper which has been impregnated with a thermosetting resin, and more particularly, as a general rule, with a thermosetting phenolic resin. When the kraft paper has been impregnated with the thermosetting resin, the sheets are dried and cut to the appropriate size. Thereupon, a plurality of these resin-impregnated sheets are stacked in a superimposed relationship. The number of plies in the stack will depend on the ultimate intended use of the laminate. For most purposes, the number of plies of these core sheets will total about seven or eight. For decorative laminates, there is then placed on the stack of core sheets a decorative sheet which is a sheet of paper bearing a printed design and impregnated with a noble thermosetting resin which is not subject to significant darkening on the application of heat. Suitable resins for the decorative sheet are the aminotriazine resins and more particularly the melamine-formaldehyde resin and benzoguanamine-formaldehyde resins, unsaturated polyester resins, and the like. All of these resinous materials are well known in the art and further delineation of the composition thereof is deemed unnecessary here. It is generally desirable, when making decorative laminates, to make use of a protective overlay sheet which is similar to the decorative sheet but generally devoid of design and in the final laminate is transparent.

In conventional procedures, the core sheets and the decorative overlay are assembled and placed between a pair of polished steel plates. Thereupon, the entire assembly is subjected to the conventional amounts of heat and pressure until consolidated into a unitary structure. When the decorative laminate is merely a solid color without printed design, such as a pastel pink, yellow, or the like, no overlay sheet is required although one may be used, if desired. On the other hand, when the decorative sheet carries a printed design, such as a geometrical figure or a message-bearing design or a floral design or a wood print, it is desirable in order to protect the design surface and thereby extend the life of the surface significantly to make use of such an overlay sheet.

These decorative laminates are produced by a plurality of manufacturers and are sold extensively throughout the world. As sold, some of these decorative laminates bear the trademark of the respective manufacturers and at the moment of sale, some of these laminates are readily identifiable with respect to source because the laminate carries on its surface the stencil or print of the trademark thereby identifying the source of the manufacture of the laminate. On ultimate installation, however, whether as a surface in furniture, counter tops or wall sidings, the printed trademark identification symbol, being readily removable, is generally promptly removed and thereafter it becomes difficult to identify the source of the manufacture of the laminate. This is particularly true when solid color decorative laminates are prepared by a plurality of laminators using precisely the same colors as their competitors thereby rendering it virtually impossible to identify the source of manufacture of the laminate after the removal of the removable trademark. Even when certain conventional printed designs are used, such as a wood print simulating mahogany, walnut, oak, birch or other woods, the similarities between the competitive laminates are so close as to make it virtually impossible in the absence of some identifying means to be able to state positively what the source of the laminate is. It is particularly desirable to be able to identify the source especially in a situation where for one reason or another a particular laminate after a number of years of use fails to give the measure of satisfaction anticipated or expected. Thereupon, a user of the laminate may complain to one manufacturer of the defect and at that point the manufacturer finds himself in the position of being unable to say with certainty that the laminate is or is not of his origin. By use of small amounts of a lithium compound in the ranges previously stated, one can, even after years subsequent to manufacture, identify the laminate with certainty as his own product if the presence of the lithium compound in the amounts stated is detected and can, by the same token, positively state that the laminate is not of his manufacture if no lithium compound in the amounts stated is detected. The use of commercially available flame photometers will readily establish the presence or absence of the lithium compound in the laminate in the amounts stated when the photometer has been calibrated so as to cover that range of proportions.

FIELD OF THE INVENTION

This invention is in the field of decorative plastic laminates which can be identified by the manufacturer who has incorporated in his product originally certain quantities of a lithium compound.

SUMMARY OF THE INVENTION

This invention relates to a process for producing a decorative laminated plastic structure containing in at least one layer thereof from about 4 to about 100 parts per million of a lithium compound. Still further, this invention relates to a method of identifying the source of manufacture of a decorative laminated plastic structure by use of flame photometry so as to detect the presence of a lithium compound in a decorative laminated plastic structure.

One of the objects of the present invention is to incorporate into at least one layer of a decorative laminated plastic structure from about 4 to about 100 parts per million of a lithium compound. A further object of the present invention is to incorporate relatively small amounts of a lithium compound into at least one layer of a decorative laminated plastic structure so as to provide a basis for identifying the source of manufacture of said laminated structure by detecting the presence of the lithium compound in the laminate by use of flame photometry. These and other objects of the present invention will be discussed in greater detail hereinbelow.

The technique for detecting the presence of a lithium compound by use of a flame photometer is well-known by skilled analytical chemists. Briefly, the technique resides in first calibrating the machine by use of a plurality of known standards. Once the flame photometer has been calibrated, an unknown sample can then be introduced into the flame photometer and the presence of the lithium compound is suspected by the development of a bright pink color in the flame of the photometer in the absence of any sodium compound. Even in the presence of sodium, light filters are provided in some commercial flame photometers so that the visual masking of the characteristic color of the lithium flame by sodium will not prevent the photometric analysis for lithium. If the needle on the dial of the calibrated photometer moves from zero to a point within the range between the lower limit and the upper limit, it is established that the lithium compound is present within the range of the amounts to which the photometer has been calibrated. If no bright pink color is developed in the flame or if the needle does not move from zero to a point within the calibrated range, it is assured that there is either no lithium compound present or that the amount of the lithium compound present does not fall within the range predetermined to be present.

In incorporating the lithium compound into the laminate, it is desired to deposit a predetermined amount of the lithium compound in the resinous material used to impregnate the paper webs to be used in the laminated structure. It has been indicated hereinabove that the lithium compound can be incorporated into at least one layer of the laminated structure or it can be incorporated in all of the layers or a selected plurality of layers less than all of the layers. In most conventional laminated structures, the core sheets are impregnated with a thermosetting phenolic resin and prior to the impregnation of such kraft paper for the purpose intended, a lithium compound can be incorporated into the phenolic resin syrup in an amount calculated to fall within the range stated and thereafter the kraft paper can be impregnated with the lithium compound containing phenolic resin, the sheets dried, cut to the appropriate size and arrangement in superimposed relationship preparatory to the heat and pressure consolidation step. When a nobler resin, such as a melamine-formaldehyde resin, is used to impregnate the decorative sheet, one can incorporate into the thermosetting melamine-formaldehyde resin syrup the predetermined amount of the lithium compound precalculated to fall within the desired stated range and thereafter impregnating the decorative sheet with the lithium compound containing the melamine-formaldehyde resin. Alternatively or concurrently, one can, if desired, incorporate the lithium compound into the nobler resin used to impregnate the overlay sheet when one elects to use said overlay sheet as when a printed design is used with the decorative sheet and thereafter the overlay sheet is then impregnated with the lithium compound containing melamine-formaldehyde resin and upon drying the overlay sheet is cut to size and is ready for use in preparing the laminated structure.

Any of the lithium compounds known can be used in preparing the laminated structure of the present invention. Included in the group of lithium compounds which may be used are the lithium hydroxide, lithium chloride, lithium bromide, lithium iodide, lithium fluoride, lithium nitrate, lithium sulfate, lithium carbonate, lithium acetate, lithium propionate, lithium butyrate, and the like. Lithium hydroxide dihydrate is preferred because of its low cost and ready solubility in the resins conventionally used in impregnating the paper sheets for conventional laminated structures. Still further, it is preferred to incorporate the lithium compound into one or more of the kraft paper core sheets since the core sheets are common to both the general purpose and postforming laminates.

In order that the concept of the present invention may be more fully understood, the following example is set forth in which all parts are parts, by weight, unless otherwise indicated. This example is set forth primarily for the purpose of illustration and any specific enumeration of detail contained therein should not be construed as a limitation on the case except as is indicated in the appended claims.

EXAMPLE 1

There is added to 450 lb. of a thermosetting phenolic resin syrup 106.65 g. of lithium hydroxide dihydrate dissolved in 1,125 ml. of water. This composition is predetermined by calculation to provide a laminate having between 4 and 100 parts per million of lithium and will vary within that range depending on whether only one laminate core sheet is impregnated or all core sheets are impregnated and also depending on the total number of core sheets used, and the ratio of resin to paper. This mixture is used in a standard conventional manner to impregnate kraft paper used in the core of both general purpose and post-forming decorative laminates. The inclusion of the lithium hydroxide does not alter in the least the processing conditions of the final laminates. After the kraft paper has been impregnated with the lithium hydroxide containing phenolic resin, the paper web is dried conventionally, cut to the appropriate size and a plurality of the sheets are stacked in superimposed relationship in a conventional manner. A decorative sheet impregnated with a thermosetting melamine-formaldehyde resin is superimposed over the core sheets and the entire assembly is heat and pressure consolidated in a conventional press between a pair of polished steel plates. Thereupon, the laminate is removed from the press and a 5 gr. sample is removed from the final laminate and is pyrolized by ashing at 600° C. The ash is analyzed by extracting the residue with water or dilute hydrochloric acid and measuring the lithium concentration on a Baird Atomic flame photometer. In one instance, the quantitative amount registered by the needle on the dial showed the presence of 10 parts per million in a post-forming laminated sample.

When a general purpose laminate sample prepared by substantially the same technique was pyrolized, leached and tested on the photometer, the quantitative amount registered by the needle on the dial showed the presence of 25 parts per million. It should be recognized that when the expression "-parts per million" is used, it means parts per million in grams of lithium compound per million grams of finished laminate.

When corresponding laminates were prepared from the same papers and resins, except that the addition of the lithium hydroxide dihydrate was omitted, the flame photometric analysis showed that, at most, 1 part per million of lithium was present, this value being substantially the limit of error in the analysis.

The expression "4 to 100 parts per million lithium compound" means that a lithium compound is introduced in sufficient quantity to provide 4 to 100 parts per million of lithium calculated as the metal.

As used hereinabove and in the appended claims, the amount of lithium compound contained in the entire laminate must fall within the stated range, namely about between 4 parts and 100 parts per million of lithium by weight based on the total weight of the final finished laminate. As a consequence by calculation all of the lithium can be contained in one lamina or may be distributed in two or more including all of the lamina.

We claim:

1. A process for manufacturing a decorative laminated plastic structure provided with an identifying source of manufacture said laminated plastic structure containing a decorative fibrous sheet and a plurality of fibrous core sheets below said decorative sheet, comprising introducing into a thermosetting resin a quantity of a lithium compound, impregnating at least one of said fibrous sheets with said lithium compound containing thermosetting resin, drying said sheet, assembling with said lithium containing thermosetting resin impregnated sheet, a plurality of additional dried fibrous sheets impregnated with said thermosetting resin with or without said lithium compound in a stacked relationship and heat and pressure consolidating the entire assembly to a unitary structure, wherein the amount of the lithium used is sufficient to provide from about 4 to about 100 parts per million by weight based on the total weight of the final finished laminate.

2. The process according to claim 1 wherein said lithium compound is present in at least one of the rigidity imparting core sheets.

3. The process according to claim 1 wherein said lithium compound is present in the decorative sheet.

4. The process according to claim 1 wherein an overlay sheet is positioned on top of said decorative sheet and said lithium compound is present in said overlay sheet.

5. The process according to claim 1 wherein said lithium compound is lithium hydroxide.

6. The process according to claim 1 wherein the lithium compound is lithium sulfate.

7. The process according to claim 2 wherein the lithium compound is lithium hydroxide.

* * * * *